(12) United States Patent
Zhou et al.

(10) Patent No.: US 10,634,829 B2
(45) Date of Patent: Apr. 28, 2020

(54) DISPLAY STRUCTURE WITH HIGH-BRIGHTNESS DIFFUSE REFLECTOR AND MANUFACTURING METHOD THEREOF

(71) Applicants: SHENZHEN GUOHUA OPTOELECTRONICS CO., LTD., Shenzhen (CN); South China Normal University, Guangzhou (CN); Shenzhen Guohua Optoelectronics Institute, Shenzhen (CN)

(72) Inventors: Guofu Zhou, Guangzhou (CN); Robert Andrew Hayes, Guangzhou (CN); Jan Groenewold, Guangzhou (CN)

(73) Assignees: Shenzhen Guohua Optoelectronics Co., Ltd., Shenzhen, Guangdong (CN); South China Normal University, Guangzhou, Guangdong (CN); Shenzhen Guohua Optoelectronics Institute, Shenzhen, Guangdong (CN)

( * ) Notice: Subject to any disclaimer, the term of this patent is extended or adjusted under 35 U.S.C. 154(b) by 539 days.

(21) Appl. No.: 15/305,642

(22) PCT Filed: Apr. 22, 2014

(86) PCT No.: PCT/CN2014/075899
§ 371 (c)(1),
(2) Date: Oct. 20, 2016

(87) PCT Pub. No.: WO2015/161432
PCT Pub. Date: Oct. 29, 2015

(65) Prior Publication Data
US 2017/0045650 A1    Feb. 16, 2017

(51) Int. Cl.
G02B 26/00    (2006.01)
G02F 1/03    (2006.01)
(Continued)

(52) U.S. Cl.
CPC ............. *G02B 5/0284* (2013.01); *G02B 1/04* (2013.01); *G02B 5/02* (2013.01); *G02B 5/0816* (2013.01); *G02B 26/00* (2013.01); *G02B 26/005* (2013.01)

(58) Field of Classification Search
USPC ........ 359/290–293, 295, 315–316, 276, 238, 359/245, 242, 259, 244, 253–254,
(Continued)

(56) References Cited

U.S. PATENT DOCUMENTS 8,115,709 B2    2/2012    Cheng et al.
2007/0030415 A1    2/2007    Epstein
(Continued)

FOREIGN PATENT DOCUMENTS

CN    101198897 A    6/2008
CN    101355836 B    1/2009
(Continued)

*Primary Examiner* — Dawayne Pinkney
(74) *Attorney, Agent, or Firm* — Proskauer Rose LLP

(57) ABSTRACT

A display structure having a high-brightness diffuse reflector, an electrowetting display structure based on the display structure, an in-cell type electrowetting display structure and a manufacturing method thereof are disclosed. The display structure comprises panel glass (1), a display layer (2) and substrate glass (3), wherein a high-brightness diffuse reflection polymer thin film material (4) is arranged under the substrate glass (3); the panel glass (1), the display layer (2), the substrate glass (3) and the diffuse reflection polymer thin film material (4) are stacked in sequence. According to the display structure and manufacturing method thereof of the invention, the required diffuse reflection and contrast ratio approximate to paper can be provided by placing a high-brightness diffuse reflection polymer thin film under a substrate or a display layer of a plate display structure as a diffuse reflection layer or a diffuse reflector.

5 Claims, 1 Drawing Sheet

(51) Int. Cl.
*G02F 1/29* (2006.01)
*G02B 5/23* (2006.01)
*G02F 1/133* (2006.01)
*G02B 5/02* (2006.01)
*G02B 1/04* (2006.01)
*G02B 5/08* (2006.01)

(58) Field of Classification Search
USPC ........ 359/265–275, 665–667, 223–225, 243, 359/260–263; 349/33; 252/586
See application file for complete search history.

(56) References Cited

U.S. PATENT DOCUMENTS

| | | | |
|---|---|---|---|
| 2009/0027317 | A1 | 1/2009 | Cheng et al. |
| 2010/0086705 | A1* | 4/2010 | Everaerts ............... C09J 171/02 428/1.54 |
| 2010/0177022 | A1* | 7/2010 | Teranishi ............. G02B 26/004 345/72 |

FOREIGN PATENT DOCUMENTS

| | | |
|---|---|---|
| CN | 101916009 A | 12/2010 |
| CN | 103955011 A | 7/2014 |
| CN | 203909327 U | 10/2014 |

\* cited by examiner

DISPLAY STRUCTURE WITH HIGH-BRIGHTNESS DIFFUSE REFLECTOR AND MANUFACTURING METHOD THEREOF

CROSS-REFERENCE TO RELATED APPLICATIONS

This application is a national stage application under 35 U.S.C. § 371 of international patent application no. PCT/CN2014/075899, filed Apr. 22, 2014, which is hereby incorporated by reference in its entirety.

TECHNICAL FIELD

The present invention relates to a display structure, in particular to a display structure with a high-brightness diffuse reflector.

BACKGROUND

At present, a panel display structure is generally adopted in a display unit used for characters, images, videos and interaction interface. The panel display structures, such as electro fluidic display system (EFD), electrophoretic display system, in-plane switching (IPS), electro-osmosis display system and liquid crystal display (LCD), are widely used in the field. A part of the display structures adopts reflection display, for example, EFD applied to E ink or electronic paper. The EFD is also called as electrowetting display, where the electrowetting refers to a phenomenon that the wettability of droplets on the substrate is changed, i.e., a contact angle is changed to deform and shift the droplets, by varying a voltage between the droplets and the insulating substrate. By wetting it refers to a process that one fluid on a solid surface is replaced by another fluid. Liquid can spread on the solid surface, and the solid-liquid contact surface has a tendency of expanding, i.e., the adhesive force of the liquid to the solid surface is larger than its cohesive force, which is wetting. Non-wetting refers to the liquid cannot spread on the solid surface and the contact surface has a tendency of shrinking into a sphere, i.e., non-wetting is the result of the adhesive force of the liquid to the solid surface is smaller than its cohesive force. The wetting effect of a water-resistant surface can be changed by voltage (so it can be called electrowetting) to make the surface more hydrophilic (wetter). Since the originally hydrophobic surface becomes more hydrophilic now, the form of the inert liquid, for example an oil layer, which well contact with the hydrophobic surface has to be changed. Such interaction attribute control is the basis for the application of electrowetting. The application of electrowetting principle is described in detailed in publication document WO03071347 and the content issued in paper 425383385 of the publication *Nature*. Referring to the principle structure diagram of wetting as shown in FIG. 1, when the electrode is applied with voltage V, charges are accumulated at the lower surface of the water layer, then its electrostatic force Fel overcomes the capacitance force Fcap and breaks through the oil layer, and the hydrophobic coating on the substrate is covered, such that the water layer contacts with the original hydrophobic coating under the action of voltage. By further increasing the voltage, the oil layer broken through can be pushed to one corner of the pixel region. If the voltage is removed, the compressed oil will return to the state before the voltage is applied.

Compared with other display technologies, the EFD and its structure have many advantages, since it has both high photoelectric efficiency and switching speed. The EFD unit is a variable aperture filter in nature. In on-state driven by voltage, its visual appearance depends on the reflection material displayed when the color oil layer is faded. A good reflection material can provide a better diffuse reflection effect for a display unit to restore a simulation effect that a user reads on a paper, meanwhile a better contrast ratio can also be provided.

In the existing electronic paper, as a transverse drive principle is required for implementing the transparent EPD, Al and Ag coatings are usually applied to bottom glass layer in a transparent display to form a mirror surface or a reflection surface, which greatly differs from a real paper.

The display screens realizing the paper simulation effects in market at present involve E ink or electronic paper display screens from Sony, Amazon kindle and the like, which are based on the EPD principle, and generally on the vertical or longitudinal drive principle based on the EPD, i.e., they are implemented as a reflection (non transparent) display system. The paper effect is realized by forming a coating on the substrate using a vacuum coating process, for example spraying TiO2 particles. The TiO2 coating process is to approximate to paper effect as much as possible, but it leads to low reflection ratio, unsatisfactory contrast ratio and high cost.

SUMMARY OF THE INVENTION

The invention provide a display structure with a high-brightness diffuse reflector and a manufacturing method thereof, to overcome the defects due to the technical problems in prior art.

In order to achieve the objective, the following technical solutions are used in the invention.

According to one aspect of the invention, a display structure with a high-brightness diffuse reflector is provided, wherein the display structure comprises panel glass, a display layer and substrate glass, and the reflector is arranged under the substrate glass, the panel glass, and wherein the display layer, the substrate glass and a diffuse reflection polymer thin film material are stacked in sequence, and the reflector is the diffuse reflection polymer thin film material.

Preferably, the diffuse reflection polymer thin film material is a PET-based material, and the thickness of which is 175-350 μm.

Preferably, the diffuse reflection polymer thin film material is filled with diffuse reflection particles, which allows a diffuse reflection to incident light.

Preferably, the substrate glass is configured to be thin enough to reduce light path between the display layer and the reflector; an adhesive layer is arranged between the substrate glass and the diffuse reflection polymer thin film material and is used for adhering the diffuse reflection polymer thin film material to the substrate side of the display structure, the optical property of the adhesive layer is adapted to transmit the incident light and emergent light to penetrate through the adhesive layer.

According another aspect of the invention, an electrowetting display structure is provided, the electrowetting display structure is similar to the display structure with a high-brightness diffuse reflector described above, wherein the display layer is an EFD switching layer.

According to a further aspect of the invention, an electrowetting display structure is provided, comprising a front panel, an EFD switching layer and a reflector, wherein the front panel, the EFD switching layer and the reflector are stacked in sequence, wherein the front panel comprises panel glass or a thin film, and the reflector is a PET-based diffuse reflection polymer thin film material.

Preferably, the diffuse reflection polymer thin film material is a PET-based material, and the diffuse reflection polymer thin film material is filled with diffuse reflection particles which allow a diffuse reflection to incident light.

According to yet another aspect of the invention, a method for manufacturing a display structure with a high-brightness diffuse reflector is provided, comprising the following steps: arranging a display layer on substrate glass; arranging panel glass on the display layer; arranging an adhesive layer at one side of the substrate glass away from the display layer; and arranging a reflector at one side of the adhesive layer away from the substrate glass, wherein the reflector is a diffuse reflection polymer thin film material, and the optical property of the adhesive layer is adapted to transmit the incident light and emergent light through the adhesive layer.

Preferably, the diffuse reflection polymer thin film material is a PET-based material and the thickness of which is set to be 170-350 μm, the diffuse reflection polymer thin film material is filled with diffuse reflection particles allowing a diffuse reflection to incident light.

According to another aspect of the invention, a method for manufacturing an electrowetting display structure is provided, comprising the following steps: arranging an EFD switching layer on a diffuse reflection polymer thin film material as a reflector; arranging panel glass on the EFD switching layer directly, or processing the front panel thin film directly on the EFD switching layer directly by a solution process, wherein the diffuse reflection polymer thin film material is a PET-based material and is filled with diffuse reflection particles which allow a diffuse reflection to incident light.

The display structure and manufacturing method thereof of the invention can be used for any non-transparent display technology, including but not limited to electrowetting display system, Electro fluidic display system, electrophoretic display system, in-plane switching display, electro-osmosic display system and liquid crystal display.

The invention has the following obvious advantages and beneficial effects compared with the prior art:

According to the display structure and manufacturing method thereof of the invention, a diffuse reflection polymer thin film is placed under the substrate of the existing display structure as a reflector to provide required diffuse reflection and contrast ratio approximate to paper. An electronic display screen fully inherited traditional paper can be realized by integrating a polymer thin film containing diffuse reflection particles behind the transparent display panel or the back of the substrate, and this thin film material can reflect as high as 93% of the ambient light, which is much higher than paper (about 80%) by being configured appropriately. The manufacturing process adopted by the invention is much simpler as compared with the existing vacuum coating process, for example, the TiO2 coating process, which avoids the pricy vacuum coating process and greatly, reduces the manufacturing cost.

BRIEF DESCRIPTIONS OF THE DRAWINGS

Embodiments of the invention will be described in detail in combination with the accompanying drawings, wherein.

DETAILED DESCRIPTION OF THE EMBODIMENTS

Figure 2:
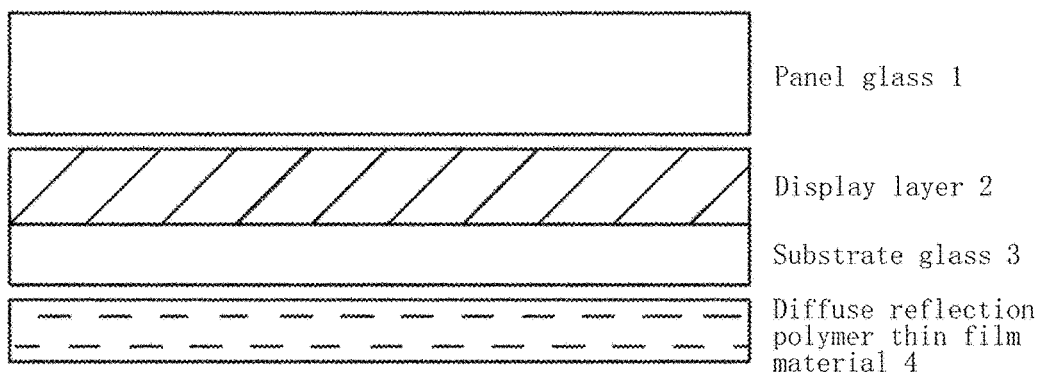
FIG. 2 is a schematic diagram of a display structure according to an embodiment of the invention.

FIG. 2 shows an embodiment of a display structure with a high-brightness diffuse reflector according to the invention, the display structure comprises panel glass 1, a display layer 2 and substrate glass 3. In the existing reflection display technology, in order to obtain a diffuse reflection effect, a diffuse reflection layer or Lambert reflector material is required to be arranged under the substrate glass 3; while in the embodiment, a diffuse reflection polymer thin film material 4 is arranged under the substrate glass 3, and the panel glass 1, the display layer 2, the substrate glass 3 and the diffuse reflection polymer thin film material 4 are stacked in sequence. The reflector is made by a diffuse reflection polymer thin film material that allowing the diffuse reflection to the incident light 5. In order to improve durability and reliability, preferably, the diffuse reflection polymer thin film material is required to have small light transmittance, i.e., have sufficient thickness, in addition, have certain physical strength, for example, have sufficient wear resistance and tear resistance to meet the demands of a preparing process, and the demands of reflection display, for example, the contrast ratio and diffuse reflection required by electronic paper.

In order to obtain a good diffuse reflection effect and enough contrast ratio to realize a viewing effect approximate to paper, as an instance, the diffuse reflection polymer thin film material 4 makes use of Melinex 329 and Melinex 339 materials, or thin film material with extremely high diffuse reflection, the Melinex materials are based on PET and filled with diffuse reflection particles such as BaTiO3. They can reflect as high as 93% of ambient light, which is much higher than paper (about 80%), thereby realizing high-brightness diffuse reflection. As for a reflector, the thickness of thin film can be 175-350 μm, preferably 175 or 350 μm, such that it is thicker than common paper, which is one of the reasons that the optical properties are improved.

Figure 3:
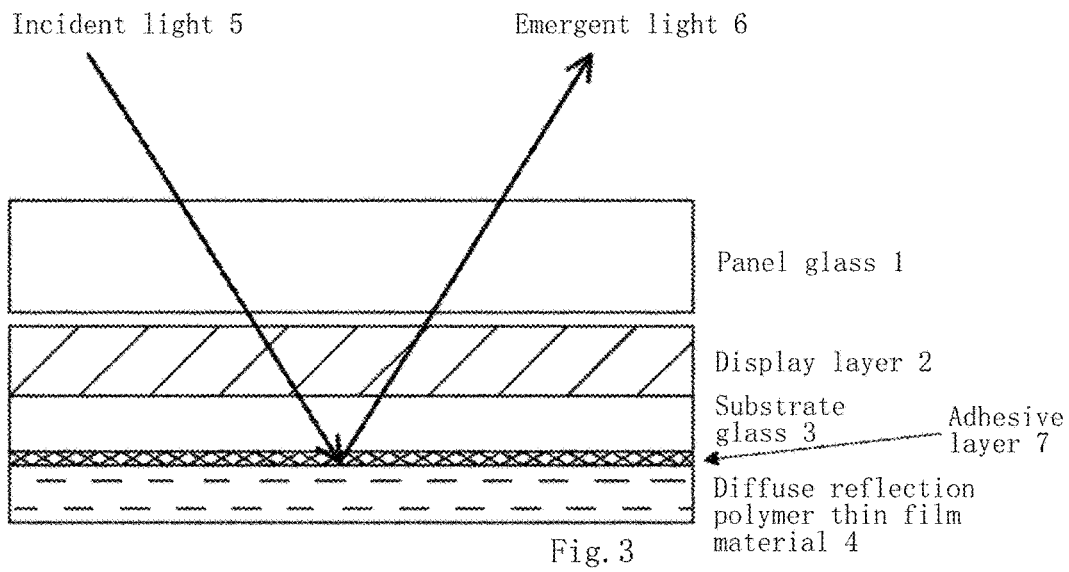
FIG. 3 is a schematic diagram of a display structure according to another embodiment of the invention.

FIG. 3 shows another embodiment of a display structure with a high-brightness diffuse reflector according to the invention, when the display layer 2 is in "on" state of the light transmittance, the incident light 5 transmits through the panel glass 1, display layer 2 and substrate glass 3, then generates reflection at the surface of reflector, i.e., the diffuse reflection polymer thin film material 4, and emergent light 6 of which exit along the original light path to the outside of the panel glass 1. In the display structure, the key problem to be solved is to reduce the interval between the display layer 2 and the reflector to improve the optical efficiency of the panel display structure with the external thin film material reflector. If the interval is too large, the refraction effects among different mediums will become obvious, thus the effective display resolution and display fineness will be limited due to the optical distortion generated by refraction. Therefore, the substrate glass 3 is processed to be thinner in the embodiment according to the required display resolution or fineness, on basis of the previous embodiment, so that the light path between the display layer 2 and the reflector can be reduced. For example, the thickness of the substrate glass 3 of the display structure is preferably set to be less than 0.5 mm, more preferably less than 0.2 mm.

In order to further improve the optical performance, an adhesive layer 7 with proper optical properties can be used, and the paper reflector is adhered to the substrate side of the display structure. Based on the above embodiments, the adhesive layer 7 can be arranged between the substrate glass 3 and the diffuse reflection polymer thin film material 4, which is used for adhering the diffuse reflection polymer thin film material 4 to the substrate side of the display structure. The optical property of the adhesive layer 7 is adapted to transmit the incident light 5 and emergent light 6 through the adhesive layer 7.

According to another aspect of the invention, a method for manufacturing a display structure with a high-brightness diffuse reflector is provided, which comprises the following steps: arranging a display layer 2 on substrate glass 3; arranging panel glass 1 on the display layer 2; arranging an adhesive layer 7 at one side of the substrate glass 3 away from the display layer 2; arranging a diffuse reflection polymer thin film material 4 at one side of the adhesive layer 7 away from the substrate glass 3, wherein the optical property of the adhesive layer 7 is adapted to transmit the incident light 5 and emergent light 6 through the adhesive layer 7. For example, the thickness of the substrate glass 3 of the display structure can be configured to be preferably less than 0.5 mm, more preferably less than 0.2 mm Preferably, the reflector is made by the diffuse reflection polymer thin film material 4 that allowing diffuse reflection to the incident light 5.

The display structure with a high-brightness diffuse reflector according to the embodiments described above can be applied to various panel display structures, in particular to a reflection type and/or flexible display structure. Based on the display principle, mechanical properties and machining processing of an electrowetting display unit, the display structure with a high-brightness diffuse reflector according to the embodiments is particularly suitable for the electrowetting display unit.

Figure 1:
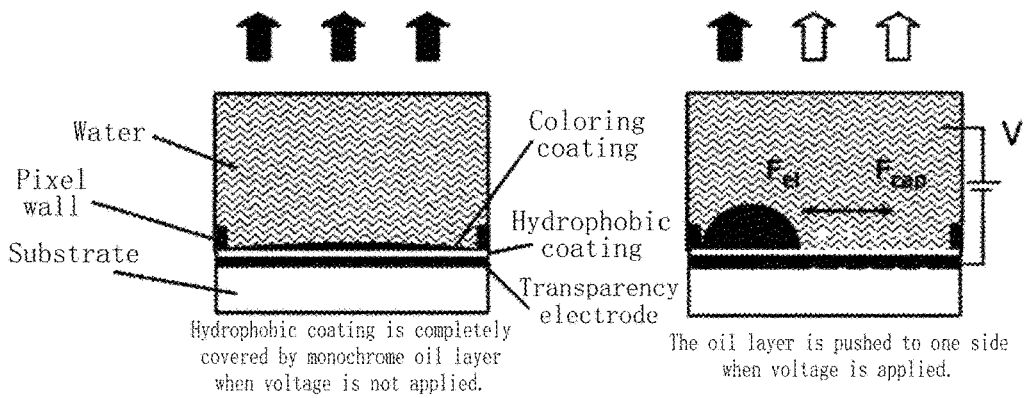
FIG. 1 is a principle schematic diagram of an EFD display structure.
Figure 4:
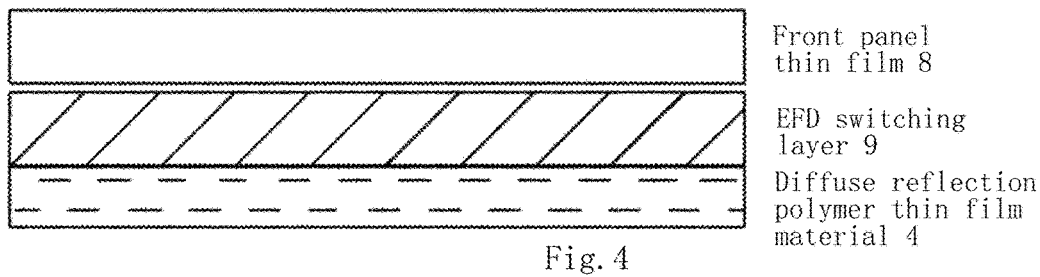
FIG. 4 is a schematic diagram of a display structure according to a further embodiment of the invention.

FIG. 4 shows an electrowetting display structure with a high-brightness diffuse reflector according to the invention, of which the specific stacking structure is similar to the above display structure with a high-brightness diffuse reflector. In the electrowetting display structure, the display layer 2 is an EFD switching layer 9. An instance of the specific structure of the EFD switching layer 9 can be seen in FIG. 1. In fact, the display structure of the invention can be well matched with the electrowetting display technology to provide an excellent display effect like paper.

According to the embodiment, a further advantage of application of the polymer thin film reflector to the electrowetting display structure lies in that: the front panel of which can be directly processed on the polymer thin film as the reflector, such polymer thin film structure can be called as an in-cell diffuser, and the total structure can be called as an in-cell electrowetting display structure. The front panel portion can comprise panel glass 1 or front panel thin film 8 and the EFD switching layer 9. Such front panel thin film 8 of the front panel portion can be manufactured based on a solution process, and thin film material which is inert with respect to the liquid used in the process and is stable in property at the process temperature can be used, for example, Melinex 329 or Melinex 339. The simplified optical stacking structure is shown in FIG. 4.

Such structure is very efficient, because the reflector is directly adjacent to the optical switching layer at the moment. Standard PET still has good size stability at a temperature as high as about 120° C. Dupont Teijin Company has released a PET with new heat stability level, which can resist the process temperature as high as 180° C. In the case where higher process temperature is required, a PEN substrate can be used, although its cost is high, it can be put into commercial use.

The display structure and manufacturing method thereof according to the invention can be used for any non-transparent display technology, including but not limited to electrowetting display system, electro fluidic display system, electrophoretic display system, in-plane switching display, electro-osmosic display system and liquid crystal display.

The descriptions mentioned above are only preferable embodiments of the invention, and the invention is not limited thereto, other embodiments also belong to the protection scope of the invention as long as they can achieve the technical effects of the invention using the same technical means. Various modifications and changes can be made to the technical solutions and/or embodiments within the protection scope of the invention. Although individual technical features are cited in different claims, embodiments sharing these features can also be contained in the invention.

The invention claimed is:

1. A display structure with a high-brightness diffuse reflector, comprising panel glass, a display layer and substrate glass, wherein
    the reflector is made by a diffuse reflection polymer thin film material, wherein the diffuse reflection polymer thin film material is a PET-based material with a thickness of 175-350 µm,
    the panel glass, the display layer, the substrate glass and the reflector are stacked in sequence, and
    the reflector is arranged under the substrate glass,
    wherein the substrate glass has a thickness of less than 0.2 mm to reduce a light path between the display layer and the reflector;
    an adhesive layer is arranged between the substrate glass and the diffuse reflection polymer thin film material, which is used for adhering the diffuse reflection polymer thin film material to the substrate side of the display structure; and
    an optical property of the adhesive layer enables incident light and emergent light to penetrate through the adhesive layer.

2. The display structure with a high-brightness diffuse reflector according to claim 1, wherein the diffuse reflection polymer thin film material is filled with diffuse reflection particles allowing a diffuse reflection to incident light of the display structure.

3. An electrowetting display structure, using the display structure with a high-brightness diffuse reflector according to any one of claims 1 or 2, wherein the display layer is an EFD switching layer.

4. A method for manufacturing a display structure with a high-brightness diffuse reflector, comprising the following steps:
    arranging a display layer on the substrate glass, wherein the substrate glass has a thickness of less than 0.2 mm to reduce a light path between the display layer and the reflector;
    arranging panel glass on the display layer;
    arranging an adhesive layer at one side of the substrate glass away from the display layer; and
    arranging a reflector at one side of the adhesive layer away from the substrate glass, wherein the reflector is a diffuse reflection polymer thin film material which is a PET-based material with a thickness of 170-350 μm, and an optical property of the adhesive layer enables incident light and emergent light to penetrate through the adhesive layer.

5. The method for manufacturing a display structure with a high-brightness diffuse reflector according to claim 4, wherein the diffuse reflection polymer thin film material is filled with diffuse reflection particles allowing a diffuse reflection to incident light of the display structure.

\* \* \* \* \*